(12) United States Patent
Furthmüller et al.

(10) Patent No.: US 7,467,703 B2
(45) Date of Patent: Dec. 23, 2008

(54) DEVICE FOR SEPARATING OVERLAPPING FLAT PRODUCTS

(75) Inventors: Stefan Furthmüller, Weizheim-Breitenfürst (DE); Bruno Fezer, Schorndorf (DE)

(73) Assignee: Wilhelm Bahmueller Maschinenbau-Praezisionswerkzeuge GmbH, Pluederhausen (DE)

( * ) Notice: Subject to any disclaimer, the term of this patent is extended or adjusted under 35 U.S.C. 154(b) by 122 days.

(21) Appl. No.: 11/798,649

(22) Filed: May 16, 2007

(65) Prior Publication Data

US 2007/0221474 A1    Sep. 27, 2007

Related U.S. Application Data

(63) Continuation of application No. 11/129,409, filed on May 16, 2005, now abandoned.

(51) Int. Cl.
*B65G 63/04* (2006.01)
(52) U.S. Cl. ............... 198/419.2; 198/418.9; 198/428; 198/432; 198/433; 198/436

(58) Field of Classification Search ............. 198/418.9, 198/419.2, 471.1, 577; 271/202
See application file for complete search history.

(56) References Cited

U.S. PATENT DOCUMENTS

| 3,363,739 | A | * | 1/1968 | Mebus | ............... 198/418.9 |
| 4,214,743 | A | * | 7/1980 | Meier | ............... 271/182 |
| 5,291,985 | A | * | 3/1994 | Spatafora et al. | ......... 198/419.3 |
| 6,820,671 | B2 | * | 11/2004 | Calvert | ............... 156/543 |

* cited by examiner

*Primary Examiner*—Gene O. Crawford
*Assistant Examiner*—Kavel P Singh
(74) *Attorney, Agent, or Firm*—Paul Vincent

(57) ABSTRACT

The invention concerns a device for separating imbricated flat products, in particular, folding boxes, with a delivery belt on which the products are supported in the form of an imbricated flow and are transported at a transport speed, with a transfer conveyor belt, disposed downstream of the delivery belt, which has a higher transport speed than the delivery belt. The transfer conveyor belt is designed as vacuum belt, or comprises a vacuum belt, and a retaining device is provided for the trailing flat products.

20 Claims, 2 Drawing Sheets

DEVICE FOR SEPARATING OVERLAPPING FLAT PRODUCTS

This application is a continuation of Ser. No. 11/129,409 filed on May 16, 2005 now abandoned the entire disclosure of which is hereby incorporated by reference.

BACKGROUND OF THE INVENTION

The invention concerns a device for separating imbricated flat products, in particular, folding boxes, comprising a delivery belt on which the products are supported in the form of an imbricated flow and are transported at a first transport speed $v_Z$, wherein a transfer conveyor belt is connected downstream of the delivery belt, whose transport speed $v_A$ is higher than the first transport speed $v_Z$ of the delivery belt.

Folding boxes are produced using, in particular, machines for folding, fastening and gluing the folding box blanks, providing them with a tape or connecting them in a different manner. The flat, i.e. not yet erected, folding boxes are supplied to a piling device in which they are stacked on top of each other to form piles or partial piles. They must be previously separated and counted. This requires a separating device.

The imbricated flow in which the individual folding boxes largely overlap is separated in this separating device such that the folding boxes are transported behind each other into the piling device at a higher speed but smaller separation from each other. Generally, this does not pose a problem if the folding boxes have a regular shape, i.e. have a rectangular cross-section and a substantially uniform thickness.

Separation of an imbricated flow of folding boxes having a non-rectangular shape or an irregular thickness across their surface, is not possible using mechanical means due to the inhomogeneity of the folding boxes which would cause jamming and disturbances within the machine. The imbricated flow is therefore manually separated by counting the desired number of folding boxes and depositing them in the form of a partial pile in a corresponding receptacle in the piling device. This is extremely time and labor-consuming, since manual work of this type can only be performed at limited speeds.

It is therefore the underlying purpose of the invention to provide a device for separating imbricated flat products which separates not only homogeneous, i.e. substantially rectangular, flat products, in particular, folding boxes, but also folding boxes having a non-rectangular cross-section and/or having different thicknesses.

SUMMARY OF THE INVENTION

This object is achieved in accordance with the invention with a device of the above-mentioned type in that the transfer conveyor belt is designed as a vacuum belt or comprises a vacuum belt, and a retaining device is provided for the trailing flat products.

In accordance with the inventive device, a leading folding box is removed from the delivery belt in that it is held by the transfer conveyor belt using vacuum. I.e. the active frictional forces generated by gravity are considerably enhanced by suctioning the folding box to the vacuum belt. The folding box held by vacuum can thereby be reliably removed from the vacuum belt and out of the imbricated flow in which it is held or retained by the trailing folding boxes. The transfer conveyor belt is itself designed as vacuum belt or an additional vacuum belt may be provided for removing the leading folding box. To ensure that only the leading folding box is removed, the adjacent downstream folding box is retained by a retaining device.

In accordance with the invention, the folding box is suctioned onto the vacuum belt through openings in the vacuum belt disposed in its longitudinal direction and a vacuum box is disposed below at least one opening, in particular, several openings for suctioning air through the opening(s). The suctioned air draws the folding box onto the vacuum belt thereby increasing the frictional forces to such an extent that the folding box is reliably carried away without slippage, thereby preventing the folding box from being twisted or jammed within the machine.

The size of the openings is suited to exert the required retaining force on the folding box. A corresponding large number of openings may be provided to increase the retaining force.

To ensure optimum, fast, and reliable removal of the folding box from the imbricated flow, the vacuum box is disposed in the direct vicinity of the intake to the vacuum belt. When the first folding box leaves the delivery belt and enters the intake region of the vacuum belt, the folding box is retained in its front region and removed at the increased transport speed $v_A$.

Reliable transport without rotation of the folding box is also ensured by providing a vacuum belt on each longitudinal side to ensure retention of the folding box in its right- and left-hand edge regions and proper transport thereof. Reliable transport of folding boxes having a non-rectangular cross-sectional shape is therefore possible.

In a particularly preferred embodiment, the position of the vacuum box can be varied to permit exact setting of the time at which the retaining force generated by underpressure acts on the folding box, to ensure as slip-free a transport of the folding box as possible, relative to the transfer conveyor belt.

To transport large, i.e. heavy folding boxes and also small folding boxes and to adjust the transfer conveyor belt to the different shapes, the size, in particular, the length of the vacuum box can be changed in the transport direction. If the folding box has a short and long longitudinal side, the long longitudinal side of the vacuum box may be increased, i.e. be longer than its short longitudinal side. This is effected in a simple manner by controlled opening or closing of a varying number of suction openings of the vacuum box.

In one inventive embodiment, the power of the underpressure in the vacuum box can be adjusted to increase the retaining force. An increase may be indicated e.g. for heavy folding boxes comprising, in particular, several layers of corrugated paper.

In accordance with the invention, the vacuum belts can be separately, independently adjusted with regard to their transport speed $v_A$, underpressure power, location of underpressure and size of vacuum boxes to correct the positions of the removed folding boxes. The position of the folding box removed from the imbricated flow can be detected e.g. using sensors and the vacuum belts can be correspondingly controlled to direct delivery of the folding boxes and to reliably prevent disturbances while also achieving a very high removal speed. This renders the inventive separating device extremely flexible and also permits connection thereof to rapidly operating folding box production plants, in particular, as an inline device.

A counter or detecting sensor for the separated products is preferably provided in the region of the transfer conveyor belt. This counter which comprises e.g. an optical sensor, a feeler or the like, detects the separated products and ensures that all subsequently formed piles have the same number of folding boxes.

In a particularly preferred embodiment, an intake belt is provided between the delivery belt and the transfer conveyor belt. This intake belt partially separates the imbricated flow i.e. reduces the imbricated density thereby increasing the speed of the individual products. The intake belt also serves as a buffer between the imbricated flow and the transfer conveyor belt to prevent standstill or impairment of the imbricated flow through temporary standstill of the transfer conveyor belt or reduction in the transport speed $v_A$ of the transfer conveyor belt which generally happens during delivery of the stacked pile. The second transport speed $v_E$ of the intake belt is higher than the first transport speed $v_Z$ of the delivery belt and lower than the third transport speed $v_A$ of the transfer conveyor belt. After removal from the imbricated flow, the folding box is accelerated on both the intake belt as well as on the transfer conveyor belt.

The second transport speed $v_E$ of the intake belt can preferably be varied to permit control of the separating degree as well as to control buffering. Moreover, precise control of the right-hand or left-hand intake belt, i.e. the intake belt on the right-hand or left-hand side of the folding box permits correction of its orientation in the transport direction.

The intake belt preferably comprises a vacuum retaining device which is designed as vacuum belt in a special embodiment. Additionally or alternatively, a vacuum box may be provided parallel to the intake belt.

This vacuum belt or vacuum box serves as a retaining device for folding boxes which have not yet been removed. The folding box is either retained on the vacuum belt or decelerated via the vacuum box using the vacuum belt or vacuum box. This has the essential advantage that the leading folding box is released from the folding box complex located on the intake belt upon being gripped by the transfer conveyor belt, if the removal force of the transfer conveyor belt is larger than the retaining force of the intake vacuum belt or the vacuum box next to the intake belt. This prevents the downstream folding box(es) from being carried along together with the leading folding box.

To precisely adjust the retaining force to the shape of the folding box, the vacuum box can be adjusted in the transport direction and/or transverse to the transport direction. A precise retaining force can thereby be exerted on the rear area of each folding box.

In this embodiment, the underpressure of the intake belt designed as a vacuum belt, or in the vacuum box next to the intake belt can also be adjusted to permit precise setting of the retaining force.

The vacuum retaining device may thereby be provided on an intake belt disposed below the folding boxes and/or on an intake belt extending thereabove. This means that the folding boxes can be decelerated or even stopped both on their lower and upper sides.

In one embodiment, the delivery belt is a dry belt. The folding boxes located on the dry belt are delivered directly from a drying station in which the folding box was glued. The folding box may also be delivered from a fastening or taping station.

Further advantages, features and details of the invention can be extracted from the dependent claims and the following detailed description of a particularly preferred embodiment with reference to the drawing. The features shown in the drawing and mentioned in the claims and in the description may be essential to the invention either individually or in arbitrary combination.

DESCRIPTION OF THE PREFERRED EMBODIMENT

Figure 1:
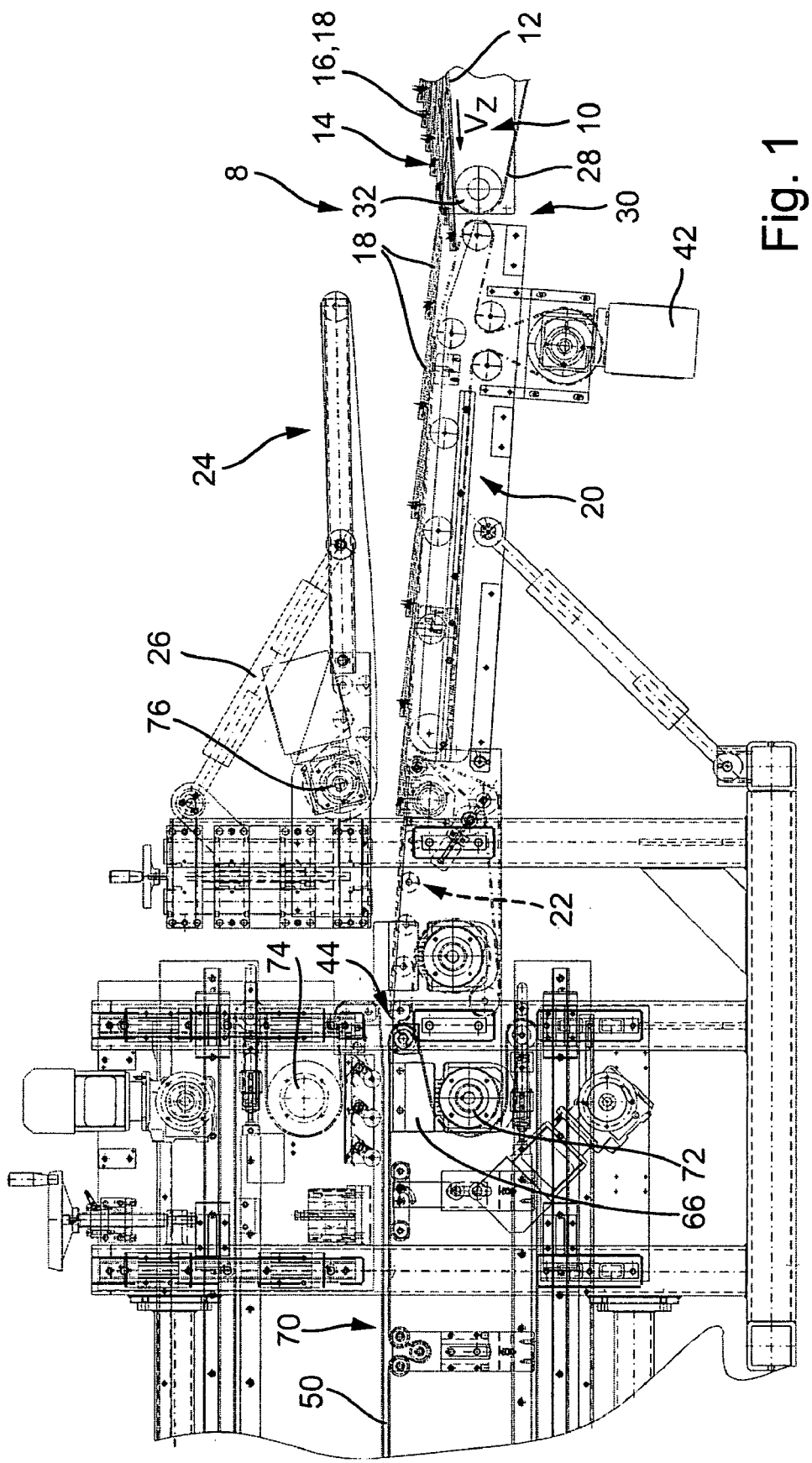
FIG. 1 shows a side view of a separating device.

FIG. 1 shows the outlet of a delivery belt designated in total with 8, in particular, of a dry belt 10, the upper run 12 of which supports an imbricated flow 14 formed by flat products 16, in particular, folding boxes 18. An intake belt designated in total with 20 is disposed downstream of the dry belt 10 and leads to a transfer conveyor belt 22. The intake belt 20 also has folding boxes 18 which are removed from the imbricated flow 14 and are partially or completely separated. A holding-down means 24 is disposed above the intake belt 20, which extends over part of the length of the intake belt 20 and has the same (second) transport speed $v_E$ as the intake belt 20.

The holding-down means 24 may be supported in the center of the folding boxes 18 but may also be shifted laterally. Several holding-down means 24 may also be provided. The position and holding-down force of the holding-down means 24 can be adjusted via an adjustment spindle 26. A link chain designed as a cable drag chain is e.g. suited as holding-down means 24, and offers the advantage that it can exert a force in one direction and deflects in the other direction. When the folding boxes 18 accumulate on the intake belt 20, the holding-down means 24 can bulge upwardly, since it is flexible in this direction, thereby safely holding the accumulating folding boxes 18. It does not droop in a downward direction to prevent unnecessary scraping against the imbricated folding boxes 18 disposed on the intake belt 20. The link chain or a spring steel belt may be loaded with weights over their length to only deflect at desired positions. Alternatively, downward holding could also be provided by a driven or non-driven belt which may also comprise e.g. pressed-on rollers.

In detail, the dry belt 10 comprises one or more belts 28 which circulate at the first transport speed $v_Z$. They guide the individual folding boxes 18 disposed in the imbricated flow 14 from a drying station (not shown) (or a fastening station, taping station or the like) to the outlet 30 of the dry belt 10, where a deflecting roller 32 is provided on which the imbricated flow 14 is lifted from the upper run 12 and is transferred to the intake belt 20. Since the second transport speed $V_E$ of the intake belt 20 is larger than the first transport speed $v_Z$ of the dry belt 10, the imbricated flow 14 is extended or the folding boxes 18 are even separated.

The intake belt 20 has two belts 34 and 36 (FIG. 2) which extend substantially along the side edges 38 and 40 of the folding box 18. The belts 34 and 36 are driven via geared motors 42, with each belt 34 and 36 having its own geared motor 42. In this manner, the speed of each belt 34 and 36 can be separately adjusted to correct the position of the folding boxes 18 on the belts 34 and 36.

The intake 44 of a transfer conveyor belt 22 is located at the end of the intake belt 20 and comprises two belts 46 and 48 which circulate at a third transport speed $v_A$. A holding-down means designated in total with 50 is provided above the transfer conveyor belt 22 and circulates at the same speed.

Figure 2:
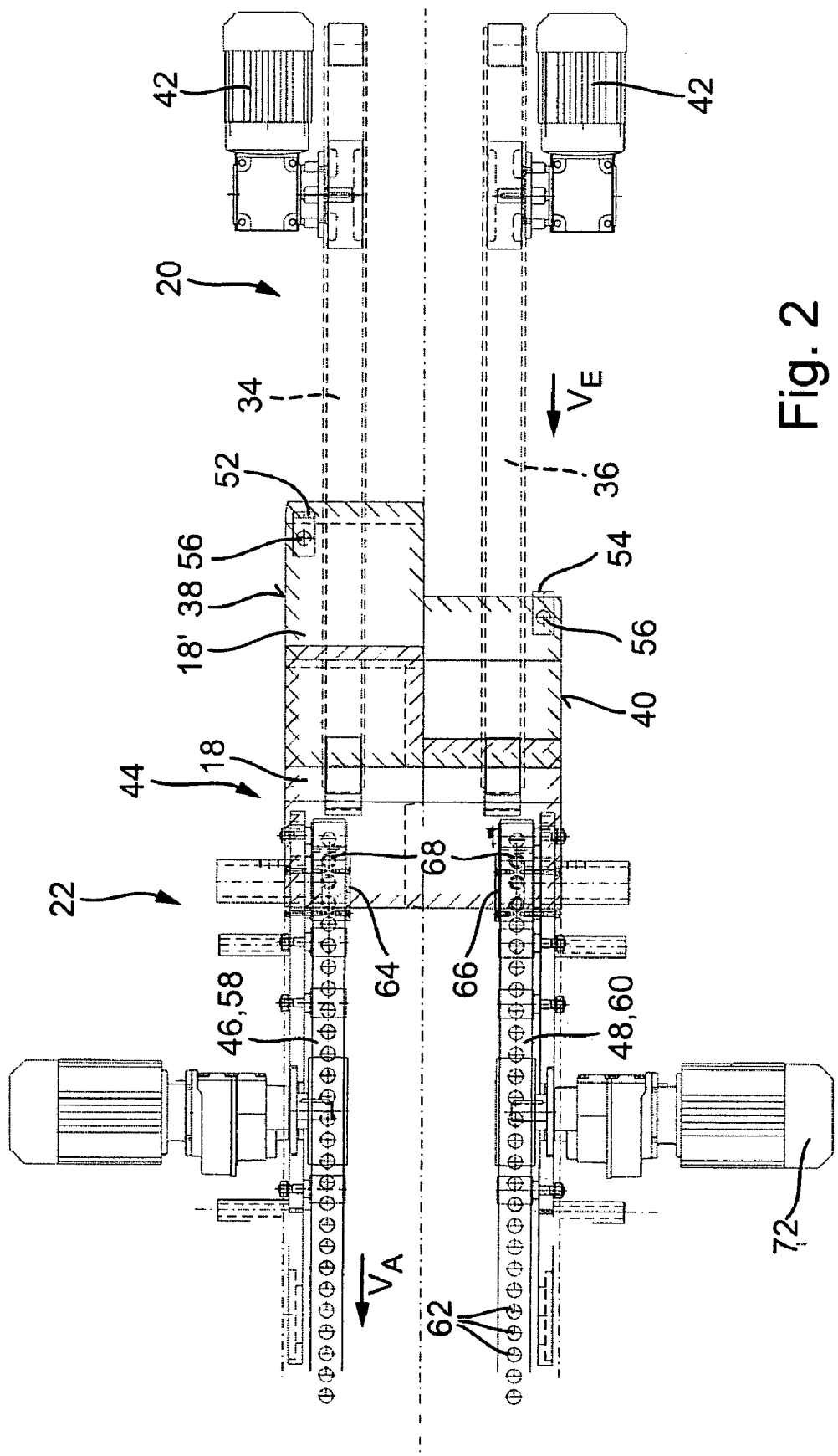
FIG. 2 shows a plan view of the separating device in accordance with FIG. 1.

FIG. 2 clearly shows two folding boxes 18 and 18' which are supported on the two belts 34 and 36 of the intake belt 20 and which partially overlap each other. Two vacuum boxes 52 and 54 are located in the region of the rear end of the right-hand folding box 18' below the folding box 18', each having an upwardly directed opening 56 and supporting the folding box 18'. When an underpressure is applied to these vacuum boxes 52 and 54, the vacuum boxes 52 and 54 suction the folding boxes 18' and hold them or decelerate the second transport speed $v_E$ thereof. The front end of the rear folding box 18' is thereby located in the direct vicinity of the intake 14 to the transfer conveyor belt 22.

When the front end of the leading folding box 18 comes into contact with the belts 46 and 48 of the transfer conveyor belt 22, removal forces are transferred from these belts 46 and 48 onto the first folding box 18. To increase these removal forces, the belts 46 and 48 are designed as vacuum belts 58 and 60 and have openings 62 which communicate with vacuum boxes 64 and 66. The vacuum boxes 64 and 66 also have openings 68 which communicate with the openings 62 of the vacuum belts 58 and 60. In this fashion, the front region of each leading folding box 18 can be suctioned by the vacuum belts 58 and 60 thereby increasing the frictional force and thereby the removal force.

When this removal force exceeds the force from the vacuum boxes 52 and 54 which retains the folding box 18, it is removed with the third transport speed $v_A$ and delivered towards the left-hand side. The following folding box 18' is suctioned by the vacuum boxes 52 and 54 and retained such that it is moved merely at the second transport speed $v_E$ of the intake belt 20, thereby safely separating the individual folding boxes 18 and 18'.

In the embodiment of FIG. 2, the folding boxes 18, 18' are L-shaped and are arranged such that the leading edge of the boxes is substantially straight and the trailing edge, stepped. The two vacuum boxes 52, 54 are displaced longitudinally with respect to another and engage near the trailing edges of the boxes at the respective intake belt 34, 36. The longitudinal displacement of the two vacuum boxes is acommodated to the trailing edge shape of the boxes such that the boxes do not twist or rotate during transfer from the intake belt 20 to the transfer conveyor belt 22.

A sensor 70 is provided for counting the separated folding boxes 18. The sensor 70 detects the leading edge of each folding box 18 and inputs a signal to a counting device.

To optimally position and optionally also correct the position of the folding box 18 on the belts 46 and 48, each belt is driven by a geared motor 72 thereby compensating for twisted positions of the folding boxes 18. Each belt of the holding-down means 50 is also driven by an individually controlled geared motor 74. The same applies for the belts of the holding-down means 24 should the holding-down means 24 also be equipped with driven belts which can each be individually controlled via a respective geared motor 76.

In one variant, the geared motor 76 drives a wheel, a roller or a belt which can be turned in a forward and backward direction. The roller or the like may be made from the most different materials, e.g. of steel, plastic material, in particular, of rubber or may be a brush. The hardness of the material or of the brush can thereby be freely adjusted to the material or the shape of the folding boxes 18. Each folding box 18 can be precisely guided on the transport belt 20, since the speed of the roller may vary as required relative to the transport speed of the folding boxes. If the roller is operated in a backward direction, the imbricated folding boxes 18 can be pulled apart in a controlled fashion before entering the transfer conveyor belt 22.

The separation between the openings 62 of the vacuum belts 58 and 60 is selected to provide maximum overlapping with the openings 68 of the vacuum boxes 64 and 66. The underpressure in the vacuum boxes 64 and 66 and also in the vacuum boxes 52 and 54 can thereby be varied to adjust the holding-down or frictional forces to desired values. The position of the vacuum boxes 52, 54, 64 and 66 can be adjusted to adjust the system to the different folding box 18 formats.

The invention claimed is:

1. A device for separating imbricated, non-rectangular, flat products and folded boxes, the device comprising:
   a delivery conveyor on which the flat products are supported as an imbricated flow, said delivery conveyor having a delivery speed;
   an intake conveyor disposed immediately downstream of said delivery conveyor to extract the flat products from said delivery conveyor, said intake conveyor having an intake speed which is larger than said delivery speed;
   an intake conveyor retention device, said intake conveyor retention device having a first intake vacuum means cooperating with a first trailing corner of the product and a second intake vacuum means simultaneously cooperating with a second trailing corner of the product, said first and said second intake vacuum means being displaced with respect to each other in a longitudinal direction, said first and said second intake vacuum means generating an intake retention force on the flat product;
   a transfer conveyor disposed immediately downstream of said intake conveyor to remove the flat product from said intake conveyor, said transfer conveyor having a transfer speed which is higher than said intake speed, said transfer conveyor having a first vacuum belt disposed on a first side of the product and a second vacuum belt disposed on a second side of the product;
   means for controlling a first transport speed of said first vacuum belt;
   means for controlling a second transport speed of said second vacuum belt, independent of said first transport speed; and transfer conveyor vacuum means communicating with said first and said second vacuum belts to extract a leading flat product from said intake belt, said transfer conveyor vacuum means generating a transfer retention force on the flat product which is greater than said intake retention force, wherein, during transfer of the product from said intake conveyor to said transfer conveyor, said first and said second intake vacuum means exercise said intake force on a rear portion of the flat product at a same time as said transfer conveyor belt vacuum means exercise said transfer retention force on a leading portion of that product.

2. The device of claim 1, wherein said first and said second vacuum belts have openings in a longitudinal direction thereof and further comprising at least one vacuum box disposed below at least one opening or below several openings for suctioning air through said opening or openings.

3. The device of claim 2, wherein said vacuum box is disposed in a direct vicinity of an intake of said first or said second vacuum belt.

4. The device of claim 2, wherein a position of said vacuum box can be changed.

5. The device of claim 2, wherein a size or a length of said vacuum box can be varied in a transport direction.

6. The device of claim 2, wherein a power of underpressure in said vacuum box can be adjusted.

7. The device of claim 2, wherein said first and said second vacuum belts can be adjusted independently of each other with respect to a power of underpressure and/or a location of underpressure.

8. The device of claim 1, further comprising a counter or a sensor disposed proximate said transfer conveyor to detect separated products.

9. The device of claim 1, further comprising an intake belt disposed between said delivery belt and said transfer conveyor.

10. The device of claim 9, wherein said intake belt has an intake speed of which is larger than said delivery speed.

11. The device of claim 10, wherein said transfer speed is larger than said intake speed.

12. The device of claim 9, wherein said intake speed can be changed.

13. The device of claim 9, wherein said intake belt comprises a vacuum retaining device or a vacuum belt.

14. The device of claim 13, wherein a vacuum box is disposed parallel to, adjacent to, and/or below said intake belt.

15. The device of claim 14, wherein said vacuum box is disposed to be adjustable in a transport direction and/or transverse to the transport direction.

16. The device of claim 13, wherein an underpressure can be adjusted.

17. The device of claim 13, wherein said vacuum retaining device is located above or below the flat products.

18. The device of claim 9, wherein said intake belt comprises a retaining device designed as wheel, roller or belt.

19. The device of claim 18, wherein said retaining device can be driven at different speeds.

20. The device of claim 1, wherein said delivery belt is a dry belt.

* * * * *